UNITED STATES PATENT OFFICE.

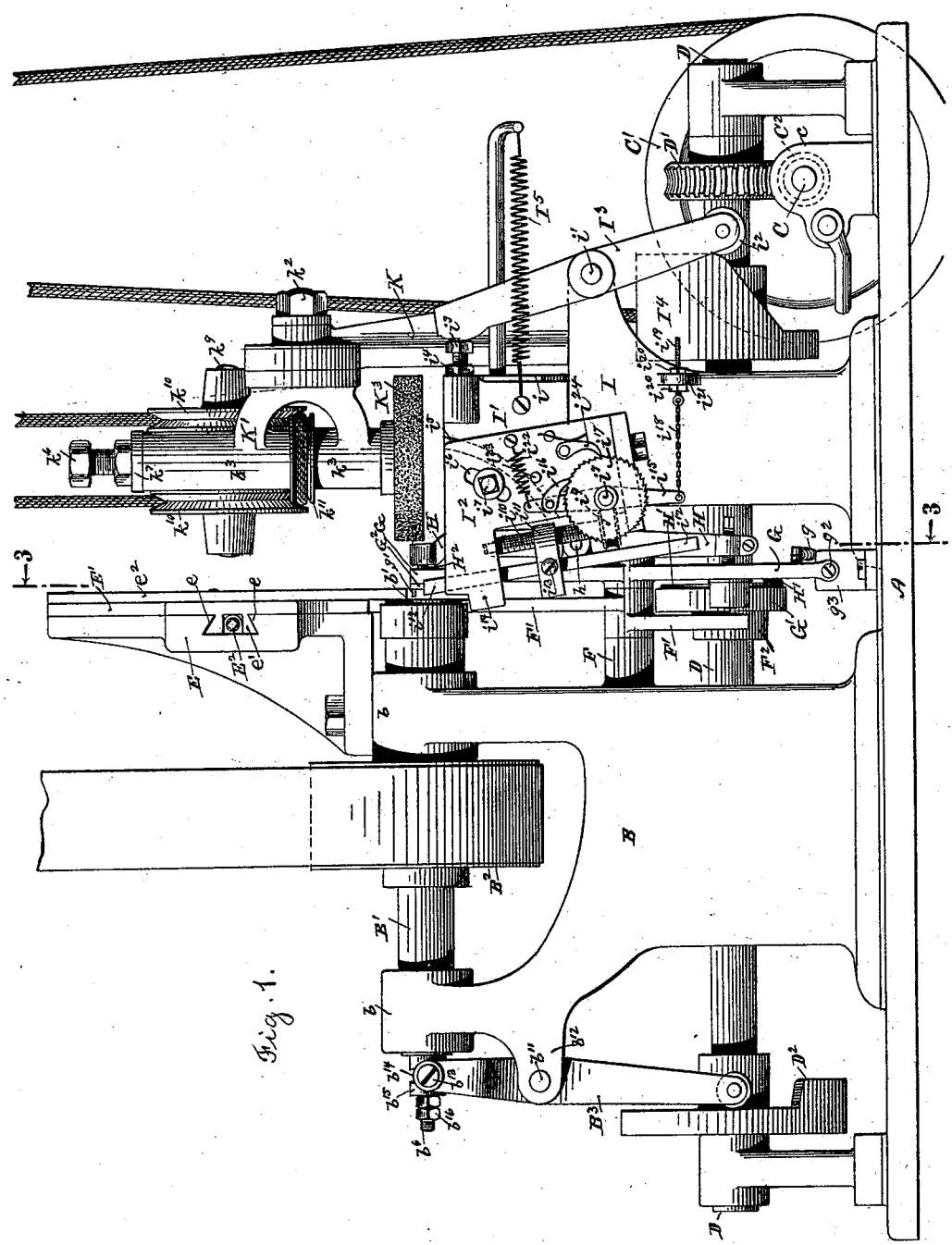

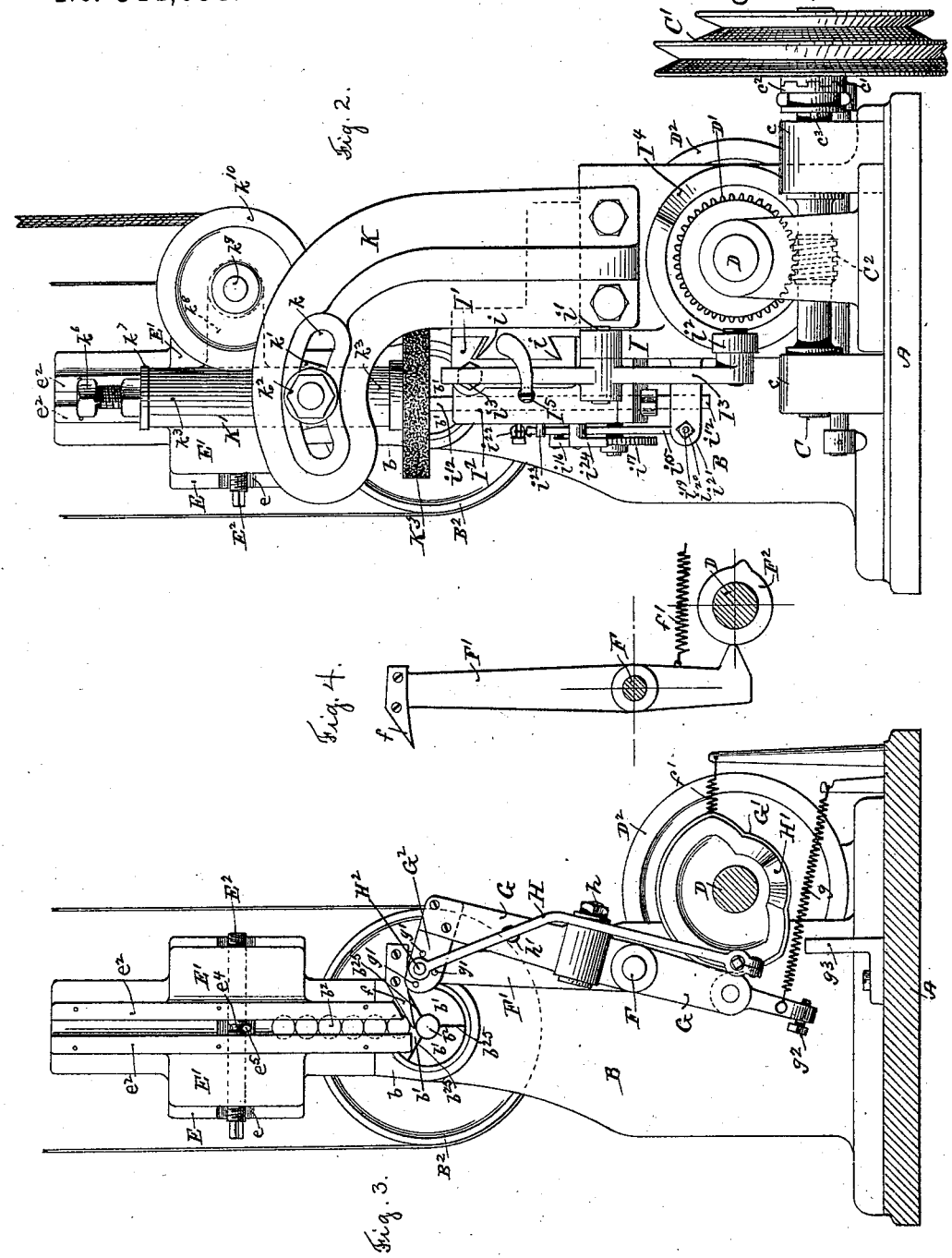

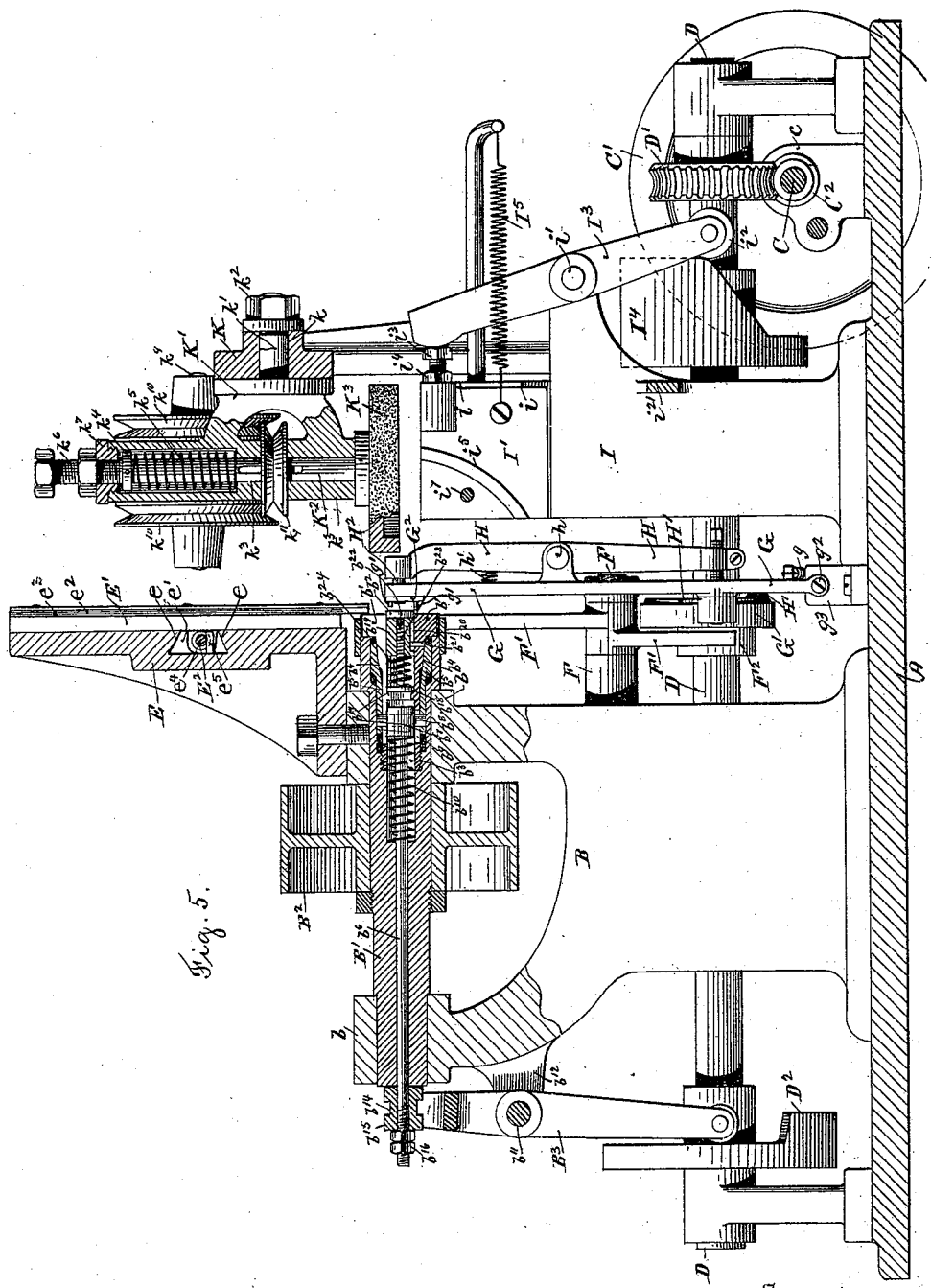

JAMES F. SPRAGUE, OF RIVERSIDE, RHODE ISLAND, ASSIGNOR TO THE STANDARD PEARL BUTTON COMPANY, LIMITED, OF DETROIT, MICHIGAN.

MACHINE FOR TURNING ARTICLES OF PEARL, &c.

SPECIFICATION forming part of Letters Patent No. 544,698, dated August 20, 1895.

Application filed January 18, 1892. Renewed June 20, 1894. Serial No. 515,190. (No model.)

*To all whom it may concern:*

Be it known that I, JAMES F. SPRAGUE, a citizen of the United States, and a resident of Riverside, in the county of Providence and State of Rhode Island, have invented certain new and useful Improvements in Machines for Turning Articles of Pearl and other Similar Material, of which the following, in connection with the accompanying drawings, is a specification.

The object of my invention is to provide a simple and efficient machine for forming buttons from mother-of-pearl and other materials, and my invention consists in the novel devices and combinations of devices hereinafter more fully specified, and pointed out in the claims.

Figure 1 is a front view of my improved machine. Fig. 2 is an end view of the same. Fig. 3 is a vertical section taken on line 3 3 of Fig. 1. Fig. 4 is a detail view of the feed-lever with its actuating-cam. Fig. 5 is a central longitudinal section of the machine with the tool-holder removed.

In the accompanying drawings, A is the bed-plate of the machine supporting the various parts.

B is the head-stock having bearings $b$ $b$, in which is journaled the spindle B', carrying the belt-pulley $B^2$, through which it obtains its rotary motion. The forward end of the spindle B' is chambered out to receive the jaws $b'$ of the chuck, which is employed for retaining the blank $b^2$ during the operation of turning. The jaws $b'$ are formed by sawing slits into the forward end of the sleeve $b^3$, and then the open space so formed between the jaws is filled with a layer of felt or other elastic material $b^{25}$, which will serve to prevent the dust and cuttings of pearl from entering the interior chamber of the chuck, and the rear end of the said sleeve is screw-threaded and is screwed into the corresponding portion of the spindle B'. The jaws $b'$ are provided on their outer surface with the conical portions $b^4$, which are operated upon to contract the jaws by the conical bore of the end of the sleeve $b^5$, which is interposed between the jaw-sleeve $b^3$ and the inner wall of the chamber in the spindle B', so that when the sleeve $b^5$ is moved on the sleeve $b^3$, in a forward direction, the conical surfaces will come in contact with each other and cause a contraction of the jaws $b'$ for the purpose of clamping the blank $b^2$. The sleeve $b^5$ is operated by means of the rod $b^6$, having at one end the enlarged portion $b^7$, into which is driven the pin $b^8$, the projecting ends of which pass through slots $b^9$ in the sleeve $b^3$, and are firmly secured to the sleeve $b^5$, so that a longitudinal movement of the rod $b^6$ will result in a like movement of the sleeve $b^5$. Interposed between the enlarged portion $b^7$ of the rod $b^6$ and the bottom of the chamber in the spindle B' is the spiral spring $b^{10}$, which tends to move the rod $b^6$ forward and thus close the jaws $b'$.

The shaft C is journaled in bearings $c$ and supports the cone-pulley C', the hub of which is provided with the clutch member $c'$, adapted to be engaged by a similar clutch member $c^2$, which is held in sliding contact on the shaft C by means of the spline $c^3$. The shaft C is also provided with the worm $C^2$, meshing into a worm-gear D', which is firmly secured to the cam-shaft D extending lengthwise of the machine. Secured upon the shaft D near its end is a cam $D^2$, which serves to rock the lever $B^3$ on its pivot-pin $b^{11}$, which is held in the lugs $b^{12}$ of the head-stock B. The upper end of the lever $B^3$ is bifurcated, and has pins $b^{13}$ entering the groove $b^{14}$ of the collar $b^{15}$, which is loosely supported on the rod $b^6$, while the check-nuts $b^{16}$ serve to limit the movement of the rod $b^6$ when pushed forward by the spring $b^{10}$ to close the jaws. It will therefore be understood that the cam $D^2$ serves to open the jaws, while the spring $b^{10}$ closes the same.

To the top of the forward bearing $b$ of the head-stock B is secured the frame-casting E, having a dovetailed way $e$ to receive the corresponding lugs $e'$ of the guide-plates E' E', each of which is provided with a removable strip $e^2$, forming a groove $e^3$ of a width equal to the thickness of the blank to be operated upon by the machine. In this manner a guideway is formed for the blanks, which are passed into the said guideway edgewise and one after the other, as shown in Fig. 3. If blanks of a different thickness are to be placed in the guideway the strips $e^2$ are removed from the plates E′ and others of the proper depth are substituted therefor; and I am furthermore enabled to adapt the guideway for blanks of different diameters by providing a screw $E^2$ with right and left hand screw-threads fitting into the lugs $e'$ of the plates E′, so that when said screw $E^2$ is turned an increase or decrease in the distance between the plates E′ will be obtained. The screw $E^2$ is also provided with a circumferential groove $e^4$, adapted to receive the pin $e^5$, which is secured to the frame E, thus preventing the longitudinal movement of the screw. (See Fig. 3.)

Pivoted on a stud F secured to the headstock B is the feed-lever F′, the upper end of which is provided with a nose $f$ adapted to hold back the blanks in the guideway and to feed the same one at a time to the jaws of the chuck. The lever F′ is rocked backward to withdraw the nose $f$ from below the lowest blank in the guideway to allow the same to drop in front of the chuck by means of a cam $F^2$, which is secured to the shaft D, while a spring $f'$ serves to rock the lever back again to properly separate the remaining blanks in the guideway from the said blank in front of the chuck. Pivoted upon the stud F is the lever G, which obtains its rocking motion in one direction through the cam G′ on the shaft D and in the other direction through the spring $g$, which is attached at one end to a post on the bed-plate of the machine. The upper end of the lever G carries a blade $G^2$, in which are held the three pins $g'$, projecting far enough from the side of the plate toward the chuck to catch the blank as it is allowed to drop from the guideway by the withdrawal of the nose $f$. In this manner the blank will be loosely supported at a point which is centrally opposite to the jaws of the chuck, and it is then ready to be pushed into its place between the jaws by the setting-lever H, which is pivoted at $h$ to the centering-lever G, and to which a rocking motion toward the chuck is imparted by a side cam H′, formed at the side of the cam G′, while a spring $h'$ serves to return the lever H to its normal position. The upper end of the lever H carries the setting-pin $H^2$, which passes through an opening in the blade $G^2$, and is adapted to push the blank off the pins $g'$ and place it within the jaws of the chuck.

In operating upon the pearl blanks it is desirable to have all of the same lot of uniform thickness. I therefore provide within the jaws of the chuck means for allowing the blank to be inserted for a certain distance, means which not only serves to square the blank relatively to the axis of the spindle and which may be adjusted for any desired thickness, but which will also discharge the finished blank from the chuck as soon as the jaws $b'$ are opened for that purpose. (See Fig. 5.)

The jaws $b'$ are provided with the annular shoulder $b^{17}$, against which rests the washer $b^{18}$, and resting in the bore of the jaws is a sliding sleeve or plug $b^{19}$, having at one side a groove $b^{20}$, adapted to receive the stationary pin $b^{21}$, whereby any rotation of the sleeve $b^{19}$ independently of the jaws will be prevented, and whereby the outward movement of the said sleeve will be limited. The sleeve $b^{19}$ is provided with a screw-threaded hole $b^{22}$ adapted to receive the screw $b^{23}$, and a spiral spring $b^{24}$ is interposed between the sleeve $b^{19}$ and the washer $b^{18}$. It will thus be seen that the sleeve $b^{19}$ can be forced inward until the end of the screw $b^{23}$ comes in contact with the washer $b^{18}$ and that the spring $b^{24}$ will serve to push the said sleeve outward until the end wall of the groove $b^{20}$ comes in contact with the pin $b^{21}$, in which case the forward end of the sleeve will be flush with the ends of the jaws and the blank will be discharged therefrom.

Secured upon the bed-plate A is the post I, provided at its upper portion with the dovetailed groove $i$, to retain in sliding contact the carriage I′ upon which the tool-holder $I^2$ is secured, and a reciprocating motion is imparted to the carriage I′, by means of the lever $I^3$, which is pivoted at $i'$ to the post I, and the lower end of which carries a roll $i^2$, adapted to be acted upon by a cam $I^4$, which is secured on the shaft D. The cam $I^4$ serves to advance the carriage I′ positively toward the chuck against the resilient action of the spring $I^5$, which serves to return the carriage to its usual position, and by means of the set-screw $i^3$ and check-nut $i^4$ the limit of the path traversed by the carriage I′ may be adjusted, so as to bring the cutting-tool to the desired nearness to the chuck. The carriage I′ is provided at its front side with a segmental rib $i^5$, adapted to enter a corresponding groove in the rear side of the tool-holder $I^2$, which is also provided with a slot $i^6$, through which the screw $i^7$ passes, for the purpose of securing the tool-holder to the carriage. Journaled in the tool-holder $I^2$ is a short spindle $i^8$, carrying a worm (not shown) which is adapted to mesh with the worm-gear $i^9$ attached to the upright screw $i^{10}$, which is also journaled in the holder $I^2$, and which serves to actuate the nut $i^{11}$, in which the tool $i^{12}$ is securely held by the set-screw $i^{13}$, and the upper end of the tool $i^{12}$ is guided in a suitable opening provided in the projection $i^{14}$ of the tool-holder.

Loosely supported upon the spindle $i^8$ is a lever $i^{15}$, the upper end of which carries a dog $i^{16}$, adapted to engage the teeth of the ratchet-wheel $i^{17}$, which is secured to the spindle $i^8$, and to the lower end of the lever is attached one end of a chain $i^{18}$, the other end of which is secured to an eyebolt $i^{19}$, firmly held by the check-nuts $i^{20}$ in the lug $i^{21}$, which is attached to or forms a part of the post I, so that when the carriage I′ advances toward the chuck the lever $i^{15}$ will be rocked slightly on the spindle, carrying the dog $i^{16}$ backward over the teeth of the ratchet-wheel $i^{17}$ against the resilience of the spring $i^{22}$, so that when the carriage moves back, the said spring will cause the movement of the ratchet-wheel for one or more teeth, and the consequent elevation of the cutting-edge of the tool, by the resulting movement of the elevating-screw $i^{10}$, the forward movement of the lever $i^{15}$ being limited by the stop-pin $i^{23}$, and a retaining-pawl $i^{24}$ being provided to prevent the backward movement of the ratchet-wheel. The tool $i^{12}$ is ground by means of an emery-wheel $K^3$, whose supporting-frame admits not only of a vertical adjustment so as to grind the tool at the proper height relatively to the work to be performed, but which may also be set so as to produce a cutting-edge lying at an angle with the horizontal plane of the axis of the chuck-spindle.

To the side of the post I (see Figs. 2 and 5) is attached the bracket K, having a slot $k$, adapted to receive the shoe $k'$ of the frame $K'$, the said slot $k$ and the shoe $k'$ being formed on an arc, the center of which is in line with the axis of the chuck-spindle, and a nut $k^2$ serves to firmly retain the frame $K'$ in position.

Journaled in the bearings $k^3$ of the frame $K'$ is the spindle $K^2$, carrying at its lower end the emery-wheel $K^3$ and at its upper end the collar $K^4$, the upper bearing being chambered out to receive a spring $k^5$, which is interposed between the collar $k^4$ and the bottom of the chamber, and which serves to hold the upper end of the spindle $k^2$ in contact with the end of the set-screw $k^6$, the latter being screwed into the cap $k^7$, which is held at the upper end of the bearing $k^3$, and by means of the screw $k^6$ the emery-wheel $K^3$ can be depressed to take up wear. Projecting rearward from the upper bearing $k^3$ is a lug $k^8$, in which is held the stud $k^9$, upon which are supported the idler-pulleys $k^{10}$, which carry the driving-belt around the pulley $k^{11}$, having a spline connection with the spindle $K^2$. The emery-wheel is so set that as the tool is traversed beneath it the cutting-edge of the said tool will be ground in a horizontal plane with the axis of the spindle, and as the tool-holder is adjustably held on the carriage the tool can be tilted so as to obtain the proper angle at the cutting-edge, according to the requirement of the specific material to be operated upon, and on the other hand I am enabled, by the adjustability of the supporting-frame $K'$ in the slot $k$, to tilt the emery-wheel transversely to the axis of the spindle and thus obtain a side bevel on the cutting-edge of the tool.

The operation of the machine is as follows: As the feed-lever F' recedes a blank leaves the guideway and is caught by the pins of the centering-lever G, after which the setting-pin $H^2$ moves forward and forces the blank into the open chuck and holds it therein until the jaws $b'$ have been closed. The setting-pin then returns to its normal position and the centering-lever G, with the setting-lever H, are carried backward, while at the same time the carriage is advanced toward the chuck, rapidly at first and then very slowly during the process of cutting, and at the return travel of the carriage the spring $i^{22}$ will cause a slight upward movement of the tool, which, when passing in contact with the emery-wheel, will be sharpened preparatory for operating upon another blank, while the finished blank will be released by the jaws and then discharged from the chuck by the spring-actuated sleeve or plug $b^{19}$.

The cutting-tool $i^{12}$ may be made of any desired form of cross-section, so as to impart the proper shape to the blank, and the said tool may be made in any desirable length and be fed forward for sharpening, as required.

I claim as my invention—

1. In a button forming machine, the combination with a blank-holding chuck and a tool sharpening grinder having fixed positions, of a cutting tool movable immediately from the chuck to the grinder without change of direction, for successively engaging with a blank and said grinder at opposite ends of its movement, whereby the tool is resharpened after each operation upon a blank, and means for reciprocating said tool, substantially as set forth.

2. In a button forming machine, the combination with a blank-holding chuck and a tool-sharpening grinder, of a cutting tool, means for moving said tool toward and away from said chuck whereby said tool is caused to engage with a blank and said grinder at opposite ends of its movement, and means for automatically feeding said tool forward in its holder, substantially as set forth.

3. In a button forming machine, the combination with a blank-holding chuck and a tool sharpening grinder having fixed positions, of a cutting tool movable immediately from the chuck to the grinder without change of direction, the surface of said tool to be ground being uppermost, and means for reciprocating said tool between said chuck and grinder, whereby the cutting edge of the tool will engage with the blanks, and the surface thereof to be ground will be brought into engagement with said grinder, substantially as set forth.

4. In a button forming machine, the combination with a blank-holding chuck and a tool-sharpening grinder having fixed positions, of a cutting-tool having an angular position with relation to the axis of the chuck, means for reciprocating said tool between said chuck and grinder and engaging the blanks and the grinder at opposite ends of its movement, and mechanism for automatically feeding the tool forward to maintain its cutting edge practically in line with the axis of the chuck and with the surface of said grinder, substantially as set forth.

5. In a button forming machine, the combination with a blank-holding chuck and a tool-sharpening grinder, having fixed positions, of a cutting tool, having an angular position with relation to the axis of the chuck, reciprocating between said chuck and grinder and engaging the blanks and the grinder at opposite ends of its movement without changing its position relative to the axis of the chuck, substantially as set forth.

6. In a button forming machine, the combination with a blank-holding chuck and a tool-sharpening grinder, having fixed positions, the grinding surface being located practically in line with the axis of the chuck, of a cutting tool having an angular position with relation to the axis of the chuck, reciprocating between said chuck and grinder and engaging the blanks and the grinder at opposite ends of its movement without changing its position relative to the axis of the chuck, substantially as set forth.

7. In a button forming machine, the combination with a blank-holding chuck having a fixed position, and a cutting tool having an angular position with relation to the axis of the chuck and reciprocating toward and away from such chuck without changing its position relative to the axis of the chuck, of a sharpening grinding wheel having a flat grinding surface rotating in a plane passing through the end of the cutting tool and engaging such cutting tool on its movement away from the chuck, substantially as set forth.

8. In a button forming machine, the combination with a blank-holding chuck, a tool-sharpening grinder and a cutting tool, relatively movable so that said cutting tool alternately engages the blanks and the grinder, of a feeding mechanism operated automatically by or in conjunction with such movement for feeding the tool forward so that its cutting end will automatically maintain a position practically in line with the axis of the chuck, substantially as set forth.

9. In a button forming machine, the combination with a blank-holding chuck and a tool-sharpening grinder, having fixed positions, of a cutting tool having an angular position with relation to the axis of the chuck, reciprocating between said chuck and grinder and engaging the blanks and the grinder at opposite ends of its movement without changing its position relative to the axis of the chuck, and a feeding mechanism operated automatically by or in conjunction with such movement for feeding the tool forward so that its cutting end will automatically maintain a position practically in line with the axis of the chuck, substantially as set forth.

10. The combination with the grinding-wheel, the chuck for holding the blanks, the cutting-tool, and automatic means for causing the movement of the cutting tool from working contact with the blank in the jaws of the chuck, to sharpening contact with the grinding-wheel, substantially as described.

11. The combination with the grinding wheel, the chuck for holding the blanks, the reciprocating carriage the angularly adjustable tool-holder, the cutting tool held in the tool holder, and automatic means for causing the movement of the cutting-tool from working contact with the blank in the jaws of the chuck, to sharpening contact with the grinding wheel, and reversely to the chuck, substantially as described.

12. The combination with the chuck, and the cutting tool adapted for movement toward and from the chuck, of the grinding wheel for sharpening said tool, and means for adjustably holding said grinding wheel, whereby the tool may be ground at different angles, substantially as described.

13. The combination with the rotating chuck, and the guide-way, of the feed-lever, the centering-lever, and the setting-lever, and means for operating the said levers to feed the blanks from the guide-way and place the same in the chuck, substantially as described.

14. The combination with the rotating chuck, and the guide-way, of the feed-lever, the centering-lever, and the setting-lever, means for operating the said levers to feed the blanks from the guide-way and place the same in the chuck, and the spring actuated sleeve or plug adapted to bear against the rear of the blank, substantially as described.

15. The combination with the centering-lever, and the setting-lever pivoted to the centering-lever, of the chuck provided with the spring-actuated sleeve or plug adapted to bear against the rear of the blank, substantially as described.

16. In a button forming machine, the combination with a blank-holding chuck and a tool sharpening grinder having fixed positions, of a cutting tool movable immediately from the chuck to the grinder without change of direction, for successively engaging with a blank and said grinder at opposite ends of its movement, means for reciprocating said tool, a feeding device delivering the blanks to the chuck, and means for operating said feeding device when the cutting tool is withdrawn from the chuck, substantially as set forth.

17. In a button forming machine, the combination with a blank-holding chuck and a tool sharpening grinder having fixed positions, of a cutting tool movable immediately from the chuck to the grinder without change of direction for successively engaging with a blank and said grinder at opposite ends of its movement, means for reciprocating said tool, a feed for automatically advancing the tool as it is ground away, a feeding device delivering blanks to the chuck, and means for operating said feeding device when the cutting tool is withdrawn from the chuck, substantially as set forth.

JAMES F. SPRAGUE.

Witnesses:
SOCRATES SCHOLFIELD,
JOHN S. LYNCH.